United States Patent
Mopagar et al.

(10) Patent No.: US 11,884,160 B2
(45) Date of Patent: Jan. 30, 2024

(54) VEHICLE BRAKING SYSTEM AND METHOD

(71) Applicant: Transportation IP Holdings, LLC, Norwalk, CT (US)

(72) Inventors: Chandrakant Basappa Mopagar, Bangalore (IN); Rajeev Verma, Bangalore (IN); Venkateswara Reddy Maram, Bangalore (IN); Rajendra Prasad Chittimalla, Bangalore (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 159 days.

(21) Appl. No.: 17/406,936

(22) Filed: Aug. 19, 2021

(65) Prior Publication Data

US 2022/0063421 A1    Mar. 3, 2022

Related U.S. Application Data (60) Provisional application No. 63/069,873, filed on Aug. 25, 2020.

(51) Int. Cl.
*B60L 15/20*    (2006.01)
*B60L 50/30*    (2019.01)

(52) U.S. Cl.
CPC ....... *B60L 15/2018* (2013.01); *B60L 15/2045* (2013.01); *B60L 15/2081* (2013.01); *B60L 50/30* (2019.02)

(58) Field of Classification Search
CPC ............. B60L 15/2018; B60L 15/2045; B60L 15/2081; B60L 50/30
See application file for complete search history.

(56) References Cited

U.S. PATENT DOCUMENTS

| 2014/0257610 A1 | 9/2014 | Kimoto et al. |
| 2020/0223435 A1 | 7/2020 | Wolff et al. |
| 2020/0298827 A1* | 9/2020 | Maughan ............... B62D 5/046 |

FOREIGN PATENT DOCUMENTS

| EP | 0743212 A2 | 11/1996 |
| EP | 743212 A2 | 11/1996 |
| JP | H06319205 A | 11/1994 |
| JP | 2001204104 A | 7/2001 |
| JP | 2004072895 A | 3/2004 |
| JP | 2004120906 A | 4/2004 |
| JP | 2006262645 A | 9/2006 |

(Continued)

OTHER PUBLICATIONS

English translation of JP-2008193772 A (Year: 2008).*

(Continued)

*Primary Examiner* — James J Lee
*Assistant Examiner* — Jonathan E Reinert
(74) *Attorney, Agent, or Firm* — The Small Patent Law Group LLC; Philip S. Hof (57) ABSTRACT

A vehicle braking system includes one or more traction motors and an electrical device configured to be electrically coupled with the one or more traction motors. The one or more traction motors are configured to propel a vehicle and to generate electric power during rollback of the vehicle down a grade. The electrical device is configured to consume the electric power generated from the rollback of the vehicle by performing work with the electric power during the rollback of the vehicle.

20 Claims, 4 Drawing Sheets

(56) References Cited

FOREIGN PATENT DOCUMENTS

| JP | 2008029051 | A | | 2/2008 |
|----|------------|---|---|--------|
| JP | 2008193772 | A | * | 8/2008 |
| JP | 2008193772 | A | | 8/2008 |
| JP | 2008193772 | A | | 2/2010 |
| JP | 2019161688 | A | | 9/2019 |
| WO | 2019034880 | A1 | | 2/2019 |

OTHER PUBLICATIONS

First Office Action received for related Japanese Patent Application No. 2021-136490 dated Dec. 21, 2022 (14 pages).
European Search Report for related European Patent Application No. 21192813 dated Dec. 22, 2021 (2 pages).
Decision of Rejection received for related Japanese Patent Application No. 2021-136490 dated May 15, 2023 (14 pages).

* cited by examiner

VEHICLE BRAKING SYSTEM AND METHOD

CROSS-REFERENCE TO RELATED APPLICATIONS

This application is a non-provisional conversion of, and claims priority to, U.S. Provisional Application No. 63/069,873, filed Aug. 25, 2020, which is incorporated by reference herein in its entirety.

BACKGROUND

Technical Field

Embodiments of the present disclosure relate to using motors to convert kinetic energy of a vehicle to electric energy.

Discussion of Art

Traction motors of a vehicle propulsion system can be utilized to slow, prevent, or stop movement of a vehicle independent of friction brakes by using the motors as generators to convert kinetic energy of the moving vehicle (e.g., rolling wheels) into electrical energy. Motor braking can be used when a vehicle starting on a grade begins to roll down the grade after releasing the brakes and before generating tractive effort to propel the vehicle in a direction of travel. If the rollback is unmitigated, the vehicle can roll into another vehicle or other equipment, causing damage and posing a safety hazard. Motor braking is also commonly used when the vehicle is traveling down a grade or to counteract the force of gravity and slow the vehicle to a desired vehicle speed without wearing the friction brakes.

In some types of vehicles, such as trains, the amount or rate of electrical energy generated by the motors during motor braking has the potential to overload the electrically conductive link or bus by supplying more electrical energy onto the conductive link than can be utilized by devices electrically connected to the conductive link, such as batteries and other energy storage devices that store the electrical energy for future consumption. Furthermore, the excessive supply of electrical energy to the conductive link can damage the electrical devices and even cause fire. Some vehicles install additional components for the express purpose of absorbing excess electrical energy generated by the motors. The additional components can include at least one array or grid of resistor elements that dissipate the electrical energy as heat. Installing such components onto a vehicle merely to dissipate electrical energy undesirably adds cost and weight to the vehicle and also occupies space, reducing the amount of space available for other components, people, cargo, and/or the like.

BRIEF DESCRIPTION

In one or more embodiments, a system (e.g., vehicle braking system) is provided that includes one or more traction motors and an electrical device configured to be electrically coupled with the one or more traction motors. The one or more traction motors are configured to propel a vehicle and to generate electric power during rollback of the vehicle down a grade. The electrical device is configured to consume the electric power generated from the rollback of the vehicle by performing work with the electric power during the rollback of the vehicle.

In one or more embodiments, a method (e.g., for vehicle braking) is provided that includes generating electric power from rollback of a vehicle down a grade. The method also includes consuming the electric power generated from the rollback of the vehicle by performing work with the electric power during the rollback of the vehicle.

In one or more embodiments, an electric vehicle is provided that includes a traction motor and a load. The traction motor is configured to generate electric power via regenerative braking during movement of the electric vehicle down a grade. The load is incapable of storing the electric power that is generated. The load is configured to receive the electric power and to perform work using the electric power that is generated from the regenerative braking during the movement of the electric vehicle down the grade.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments described herein are directed to a system and method for actively using the electrical energy generated during vehicle motor braking. For example, the system and method control the generation of electrical energy and the conduction of the electrical energy onboard a vehicle such that the electrical energy is consumed by one or more electrical devices on the vehicle. The one or more electrical devices consume the electrical energy by performing work with the electric power during the motor braking. The one or more electrical devices actively perform work by exerting a force to move a mechanical device or object, as opposed to dynamic braking grids of resistors that passively dissipate electric power as heat. In embodiments, the electrical power generated by the motor braking is used to power an auxiliary motor that moves a piston or set of pistons to compress air. In other embodiments, the electrical power generated by the motor braking may be used to power other electrical devices that cause a mechanical device or other object to move, i.e., and thereby perform work.

The embodiments described herein are agnostic to the presence dynamic braking grids onboard the vehicle. For example, the motor braking system can be disposed on vehicles that do not include resistor grids and associated hardware for dissipating the electric power generated by the motors as heat. Such vehicles may benefit cost savings, weight savings, and/or space savings attributable to the lack of the resistor grids and associated hardware. In other embodiments, the motor braking system can be utilized on vehicle that do have resistor grids. The use of the motor braking system and method of using the system can reduce or entirely eliminate the workload of the resistor grids by diverting the electric power to one or more electrical devices that consume the current to perform work. By dissipating less energy as heat, the vehicles that utilize the motor braking system and method described herein can alleviate heat mitigation operations, such as by less frequently operating blowers, fans, or other active cooling devices.

In an embodiment, the vehicle does not have resistor grids, and the motor braking system limits the power generation of the traction motors to a level that can be consumed by one or more auxiliary electrical devices on the vehicle during the motor braking operation. Because the power generated by the traction motors does not exceed the load that can be handled by the auxiliary electrical devices, all of the usable power generated during the motor braking can be consumed by the auxiliaries, without storing the power for later use or dissipating the power as heat. The motor braking system is configured to achieve and maintain this balance between the power supply by the traction motors and the power consumption by the electrical devices to avoid a rapid increase in the voltage on the bus, also referred to as DC link voltage overshoot.

Figure 1:
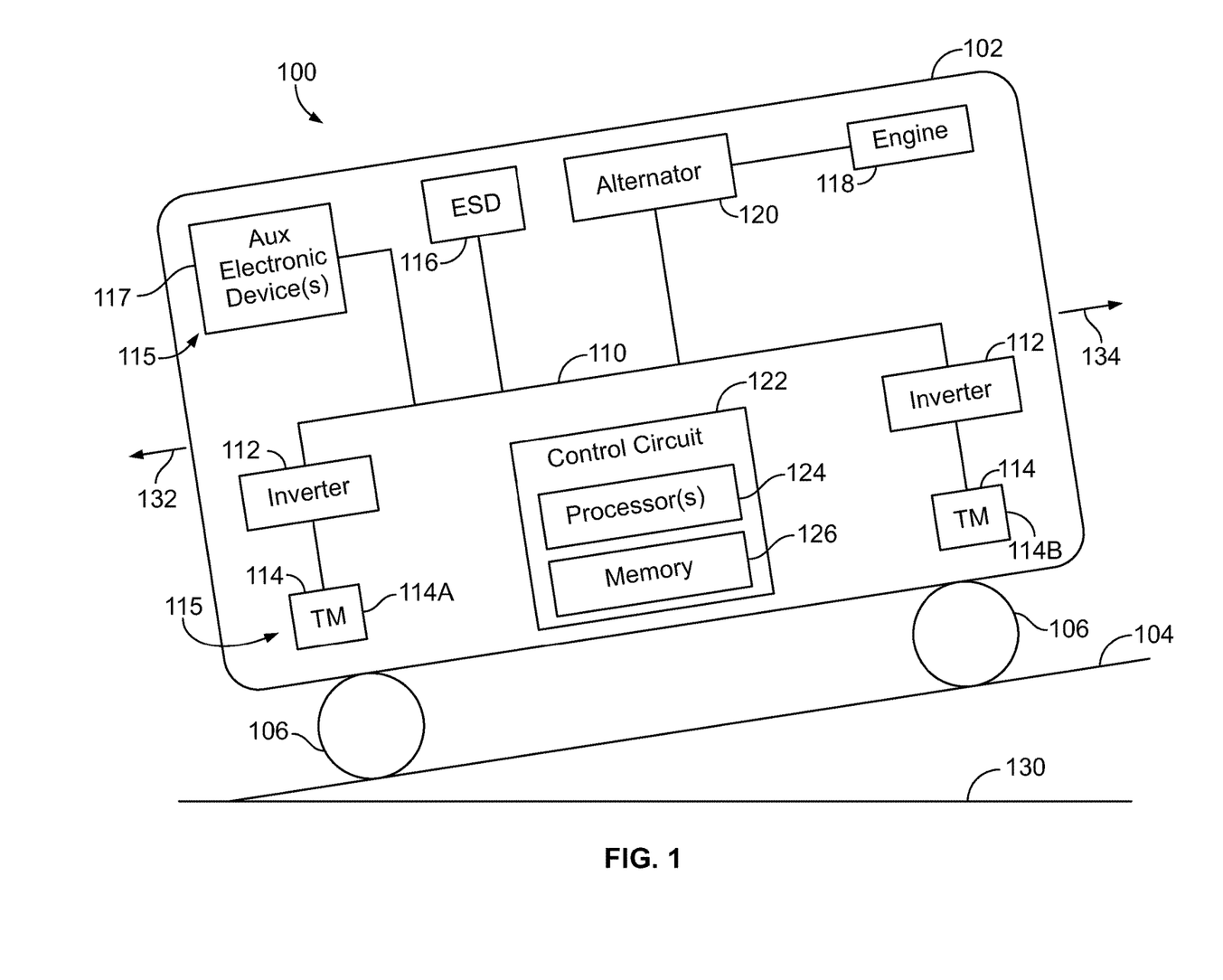
FIG. 1 is a schematic illustration of a vehicle motor braking system disposed on a propulsion-generating vehicle according to an embodiment.

FIG. 1 is a schematic illustration of a vehicle motor braking system 100 disposed on a propulsion-generating vehicle 102 according to an embodiment. The propulsion-generating vehicle (also referred to herein as vehicle) is land-based and travels on a route 104. The vehicle includes a plurality of wheels 106 that engage the route segment. The vehicle moves along the route by exerting torque on at least some of the wheels to force rotation of the wheels in contact with the route.

In an embodiment, the vehicle can be a rail vehicle, such as a locomotive, and the route is a railroad track. In other examples, the vehicle motor braking system can be disposed onboard another type of vehicle, such as a truck (e.g., highway semi-truck, mining truck, logging truck, or the like), an automobile, a bus, and/or the like, and the route can be a paved road, an off-road path, or the like. Although not shown in FIG. 1, the vehicle may be coupled to one or more wheeled loads, such as rail cars, trailers, or other non-propulsion vehicles, to pull and/or push the wheeled loads along the route.

The motor braking system includes one or more traction motors 114 and one or more electrical devices 115 that are electrically coupled with the traction motors. The motor braking system also includes a control circuit 122 or controller 122 onboard that is operably connected to the one or more electrical devices and the one or more traction motors. The control circuit represents hardware circuitry that includes and/or is connected with one or more processors 124 (e.g., one or more microprocessors, integrated circuits, microcontrollers, field programmable gate arrays, etc.). The control circuit includes and/or is connected with a tangible and non-transitory computer-readable storage medium (e.g., memory) 126 disposed onboard the vehicle. For example, the memory may store programmed instructions (e.g., software) that is executed by the one or more processors to perform the operations of the control circuit described herein. The memory additionally or alternatively may store different information, such as a route database, a trip schedule, a trip plan that provides tractive and braking settings associated with different locations along the route, parameters of the vehicle, and/or the like. The control circuit may control the traction motors to propel the vehicle during a traction (or drive) mode of operation and to generate electric power based on the movement of the vehicle during a motor braking mode of operation. The control circuit may control the amount or rate of electric power generated by the traction motors and/or may direct the conduction of the electric power to the one or more electrical devices 115 that consume the electric power by performing work during the motor braking of the vehicle.

In one or more embodiments, the one or more electrical devices that consume the generated electric power are incapable of storing the electric power for powering a load at a later time. In one example, the one or more electrical devices may include non-propulsion-generating auxiliary electrical devices 117 that do not propel the vehicle (e.g., do not generate torque). The auxiliary electrical devices can include various electro-mechanical devices that use the electrical power to cause movement of a mechanical device or other object. Non-limiting examples of electrical devices include compressors, pumps, motors, blowers, actuators, and the like. The electrical devices optionally may be components of heating, ventilation, and air conditioning (HVAC) systems, computing systems, lighting systems, and/or the like.

In another example, the one or more electrical devices that consume the generated electric power can include propulsion-generating electrical devices, such as traction motors. In the illustrated embodiment, the vehicle has two traction motors 114A, 114B. Both traction motors can be utilized to generate torque to propel the vehicle during the traction mode. During the motor braking mode, the first traction motor 114A may be controlled to generate electric power based on the kinetic energy of the vehicle, and the second traction motor 114B may represent an electrical device that is controlled to consume the electric power that is generated by the first traction motor. During a rollback situation in which the vehicle on a grade (e.g., incline) begins to roll down the grade upon release of vehicle friction brakes, the second traction motor may utilize the electric power to perform the work of generating torque that urges the vehicle up the grade to counter the rollback. The second traction motor may generate torque to assist with stopping the rollback of the vehicle down the grade and/or propel the vehicle up the grade by generating propulsion as the work that is performed.

The vehicle includes an electrical power drive system that supplies and conducts the electrical energy for propelling the vehicle. The motor braking system may utilize the power drive system and include components of the power drive system. The power drive system includes a direct current (DC) bus or link 110, at least one source of electrical power capable of powering vehicle propulsion, inverters 112, and the traction motors 114. Each inverter is associated with a different corresponding traction motor. One example source of electrical power onboard the vehicle is an energy storage device 116, which may include one or more battery cells, battery modules, capacitors, or the like. Another example source of electrical power is a fuel combustion engine 118 that mechanically drives an alternator 120. The vehicle drive system in the illustrated embodiment is a hybrid vehicle system that includes both the energy storage device and the engine and alternator. In an alternative embodiment, the vehicle may lack the energy storage device or may include an energy storage device for powering auxiliary loads but that is incapable of powering vehicle propulsion. In a second alternative embodiment, the vehicle may be a fully electric vehicle that lacks the engine and alternator.

The DC bus electrically connects the sources of electrical power to the inverters and associated traction motors. The one or more auxiliary electrical devices are electrically connected to the DC bus. The control circuit may selectively open and close electrical switches (e.g., relays, contactors, and the like) along the DC bus to control which components are able to receive electric power from and/or supply electric power to the DC bus at a given time. The control circuit may also generate control signals that are conveyed to the inverters for switching solid-state power elements (e.g., transistors) of the inverters on and off, to convert the DC electrical power on the DC bus to another power waveform that is suitable for powering the associated traction motor. For example, the inverters may be configured to convert DC to 3-phase alternating current (AC) for electrically powering an AC traction motor. The traction motors are mechanically connected to the wheels via mechanical linkages, such as gears, axles, and the like. During the traction mode, the traction motors convert the electrical energy to mechanical energy that exerts torque to rotate the wheels via the mechanical linkages.

In FIG. 1, the vehicle is located on a segment of the route that has a grade (e.g., incline) relative to horizontal 130. The force of gravity urges the vehicle in a down grade direction 132. The vehicle may switch to the motor braking mode while the vehicle is on the segment. In the motor braking mode, one or more of the traction motors are controlled to function as a generator to convert kinetic energy of the vehicle moving in the down grade direction into electrical energy. For example, the rotation of the wheels during the vehicle movement, translated through the axles and mechanical linkages, causes rotation of the rotors of the traction motors relative to the stators. The traction motors provide resistance to the wheels and mechanical linkages, which slows the down-grade movement of the vehicle. The rotation of the rotors relative to the stators generates electric power that is routed through the inverters to the DC bus.

In an embodiment, the motor braking system can control the amount and/or rate of electric power that is supplied from the one or more traction motors and inverters onto the DC bus. The supply of generated current to the DC bus during motor braking is monitored and controlled to avoid exceeding the voltage and/or current carrying capacity of the DC bus and the voltage and/or current consumption capacity of the electrical devices that utilize the electric power to perform work. Furthermore, the motor braking system can control the consumption of the electric power on the DC bus by the one or more electrical devices that consume the electric power during the motor braking mode of operation. The motor braking system balances the generation and consumption of electric power within tolerance margins during the motor braking to enable approximately all of the generated electric power to be consumed without dissipating current through a resistor grid as heat. For example, the generated current is supplied to the DC bus to maintain a designated link voltage or voltage range on the DC bus. Concurrently, the electrical devices are operated to pull current from the DC bus. The rate of current draw is balanced with the rate of current supply to maintain the DC bus at the designated link voltage or within the designated voltage range. The electrical devices consume approximately all of the generated electric power by the traction motors during the motor braking such that none of the current is intentionally dissipated as heat through grid resistors, although a small amount of current may dissipate as heat along the DC bus and other conductive pathways due to inherent resistance in the electrically conductive members (e.g., the wires, switches, and the like). Approximately all of the generated electric power may represent at least a threshold level, such as at least 95%, at least 96%, at least 97%, at least 98%, or at least 99% of the total electric power generated by the traction motors during the motor braking operation.

In conventional vehicles that can perform motor braking, the electric power generated by the traction motors can be used to charge energy storage devices and power auxiliary loads, and any excess current supplied to the bus is directed to dynamic braking grids for dissipating the electric power as heat. Because the grids dissipate excess current, the amount of current generated by the motors is not monitored or controlled. The motor braking system described herein does not utilize resistor grids to dissipate excess current as heat. For example, the vehicle in FIG. 1 may not even include installed resistor grids. Furthermore, the electric power may be generated in an amount and/or at a rate that exceeds a capacity of the energy storage device, such that less than all of the electric power can be stored in the energy storage device. The energy storage device of the vehicle may not even be able to absorb and store the amount of excess current supplied to the DC bus that is not consumed by the one or more electrical devices. To remedy this deficiency, the control circuit of the motor braking system is configured to control and monitor that current that is supplied to the DC bus from the inverters and motors as well as the current that is consumed by the electrical devices (by performing work) to maintain a balance. The balance can be represented by the voltage of the DC bus remaining within a designated voltage range during the motor braking operation.

The control circuit may balance the generation and consumption of electric power by first determining the electrical energy consumption capacity (or capability) of the one or more electrical devices that consume the generated current. The consumption capacity represents the upper limit of voltage, current, and/or power that the one or more electrical devices can consume to perform work without causing an increased risk of performance failure, damage to the devices, or overheating. For example, the consumption capacity can represent an upper power limit for an electrical device that is based on a designated product rating. The upper power limit represents the maximum allowable rate of electric power that the electrical device is designed to consume. The consumption capacity can be determined by measuring electrical consumption properties while the respective electrical device is operating at full power or load. Alternatively, the consumption capacity can be determined based on manufacturer-provided device information, which may be input or uploaded into the memory of the control circuit. If multiple electrical devices will be concurrently supplied electric power during the motor braking, then the individual consumption capacities can be aggregated to determine the consumption capability of the group of electrical devices.

After determining the consumption capacity, the control circuit controls the inverters and traction motors during the motor braking to limit the electric power that is generated and supplied to the DC bus to a level that does not exceed the consumption capability of the one or more electrical devices that are tasked with consuming the electric power. The control circuit may limit the electric power that is generated by the motors by controlling the torque of the motors. The electrical power generated by a traction motor is based on the torque and the rotating speed of the rotor. For example, power can be calculated as torque times rotating speed. The rotating speed may depend on the rotation of the vehicle wheels and/or axles. The electrical power can be determined based on the consumption capability of the one or more electrical devices. Based on the equation, the control circuit can calculate the torque level or setting of the motors that is required to prevent excessive current supply to the DC bus. Then the control circuit controls the one or more traction motors to operate at that torque level. The torque can be adjusted by controlling settings and/or properties of the inverters and/or the motors. For example, the control circuit may change a frequency of an inverter to modify the torque of the associated motor. In another example, the control circuit may adjust the phase sequence of the motor or modify phase connections within the motor.

In addition to controlling the supply of current, the control circuit controls the electrical devices to continuously operate throughout the motor braking operation. For example, the control circuit may operate the one or more electrical devices at a designated level, such as full power, as soon as the motor braking (e.g., traction motor generation of electric power) commences and may maintain the electrical devices operating at the designated level until at least the motor braking ends. Continuously operating the one or more electrical devices ensures that the generated current is consumed without causing a rapid increase in the voltage on the DC bus.

In an embodiment, the motor braking system may operate during rollback of the vehicle down the grade. Rollback may occur when the vehicle is preparing to start traveling while located on a grade after releasing friction brakes. For example, the vehicle direction of travel may be the up grade direction, but the vehicle may start to roll backwards in the down grade direction upon release of the brakes until tractive effort is provided to urge the vehicle in the up grade direction. Rollback is uncontrolled movement of the vehicle that is a safety concern. The motor braking system may utilize motor braking to slow and/or stop the rollback of the vehicle down the grade, alleviating the risk of damage or harm caused by rollback. For example, as the wheels of the vehicle rotate during the rollback of the vehicle down the grade, the traction motors can generate electric power, and the one or more electrical devices can consume the electric power that is generated by performing work during the rollback of the vehicle. In an embodiment, the control circuit may automatically switch to the motor braking mode of operation during a vehicle start sequence in preparation for the rollback to occur upon releasing the brakes. The control circuit may switch to the traction mode in response to receiving a control signal commanding tractive effort to propel the vehicle.

The motor braking system may also operate while the vehicle is traveling along a relatively flat segment of route and/or traveling along a decline grade. For example, the vehicle may be traveling along the route in the down grade direction 132 shown in FIG. 1. To counteract the force of gravity that could accelerate the vehicle in the down grade direction, the vehicle may utilize motor braking to slow the vehicle and maintain a desired vehicle speed. The control circuit may switch to the motor braking mode upon receiving a signal from an operator input device indicating that the operator of the vehicle commands implementing motor braking (e.g., dynamic braking). Optionally, the control circuit may automatically switch to the motor braking mode based on the grade, current vehicle movement characteristics (e.g., current speed), and designated vehicle movement characteristics. The designated vehicle movement characteristics may be based on operator input (e.g., selection of a specific speed of travel), a trip plan that designates speed based on location along a known route, or the like. The grade can be determined based on sensors onboard the vehicle, such as tilt sensors, and/or based on a route database and the measured location of the vehicle along the route. For example, the location of the vehicle can be determined based on GPS signals, and the location can be compared to a route database that includes information about different areas or segments of the route. The route database could describe the grade at multiple different segments of the route. If the control circuit determines that the vehicle is traveling down a grade and the current speed is in excess of a designated speed (or a regulated speed limit), then the control circuit may switch to the motor braking mode to utilize the traction motors to slow the vehicle. After the vehicle speed reaches or falls below the designated speed, the control circuit may switch back to the traction mode.

Figure 2:
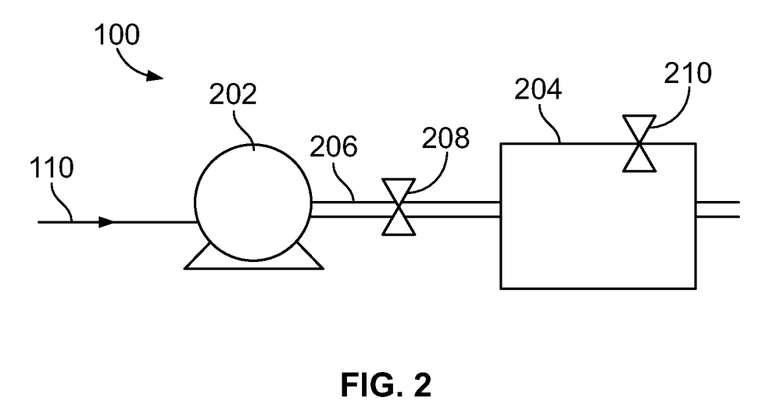
FIG. 2 illustrates a portion of the motor braking system according to an embodiment.

FIG. 2 illustrates a portion of the motor braking system 100 according to an embodiment. In the illustrated embodiment, the portion of the motor braking system includes a compressor 202. The compressor represents an electrical device that is configured to consume the electric power generated by the traction motors during the motor braking operation. More specifically, the compressor represents a non-propulsion-generating auxiliary electrical device 117 as shown in FIG. 1. The compressor is electrically connected to the DC bus 110 and is powered by the electric power on the DC bus. The compressor performs the work of compressing air. For example, the power received from the DC bus may power an internal motor that converts the electrical energy into mechanical energy that spins a turbine. The rotating turbine draws air into the compressor and compresses the air. Due to the work that is performed, the air exiting the compressor is at a higher pressure than the air entering the compressor.

The compressor is fluidly connected to an air reservoir 204 of the vehicle via a tube 206. The tube may be a flexible or rigid length of pipe, hose, or the like. Air the exits the compressor flows through the tube and enters the reservoir to load the reservoir with compressed air. A flow valve 208 may be installed on the compressor and/or the tube. The flow valve is selectively opened and closed to control the flow of compressed air from the compressor to the reservoir. For example, in the open state, compressed air flows from the compressor through the tube to the reservoir. In the closed state, no air enters the reservoir through the tube. The flow valve may be communicatively connected to the control circuit via a wired or wireless communication pathway. The control circuit may control the positioning of the flow valve by generating control signals that are communicated to the flow valve.

In an embodiment, a release valve 210 is fluidly coupled with the air reservoir and is configured to selectively open the reservoir to enable compressed air to exit the reservoir. For example, in a closed position, the release valve covers or plugs an opening or port through a wall of the reservoir. The positioning of the release valve between the open and closed states may be controlled by the control circuit. The release valve can be a plug magnet valve or another type of valve. Optionally, the release valve may be configured to automatically open, regardless of a control signal from the control circuit, in response to a pressure within the reservoir exceeding a designated upper limit for safety purposes.

Prior to operating in the motor braking mode, the control circuit first determines the electrical consumption capacity of the one or more electrical devices that are tasked with consuming the electric power generated during the motor braking mode. In the illustrated embodiment in which the one or more electrical devices include the compressor, the control circuit may measure or calculate the rate or amount at which the compressor consumes electric power while operating at a designated setting. The designated setting may be the full power setting or full load. The electrical power consumption of the compressor at the full power setting indicates the upper power limit that the compressor can consume. The consumption can be measured using one or more sensors that generate signals indicative of the rate or amount of current drawn by the compressor. Optionally, the compressor may be the only electrical device that is utilized to consume the electric power generated by the one or more motors during motor braking. Alternatively, the compressor may be used with other electrical devices, such as another compressor, another type of auxiliary electrical device, or even a traction motor, to consume the generated electric power during motor braking. As described above, after determining the aggregate consumption capacity of the one or more electrical devices, the control circuit may make adjustments to the inverters and/or traction motors upon switching to the motor braking mode in order to balance the amount or rate of electric power that is generated by the motors with the amount or rate of current consumed by the one or more electrical devices.

In an embodiment, upon switching to the motor braking mode, the control circuit automatically controls the compressor to operate at the designated setting, such as the full power setting. For example, if the compressor is already operating at a different setting, the control circuit may send a control signal that commands the full power setting. If the compressor is off, the control circuit turns on the compressor to the full power setting. If the compressor is already operating at the full power setting, the control signal maintains the compressor operating at that setting, such as by preventing or blocking the transmission of signals commanding the compressor to deviate from the full power setting. The compressor may be controlled to operate at the full power setting throughout the duration of the motor braking operation. The control circuit may utilize the valves to ensure that the compressor can maintain operation at the full power setting for an extended amount of time.

Figure 3:
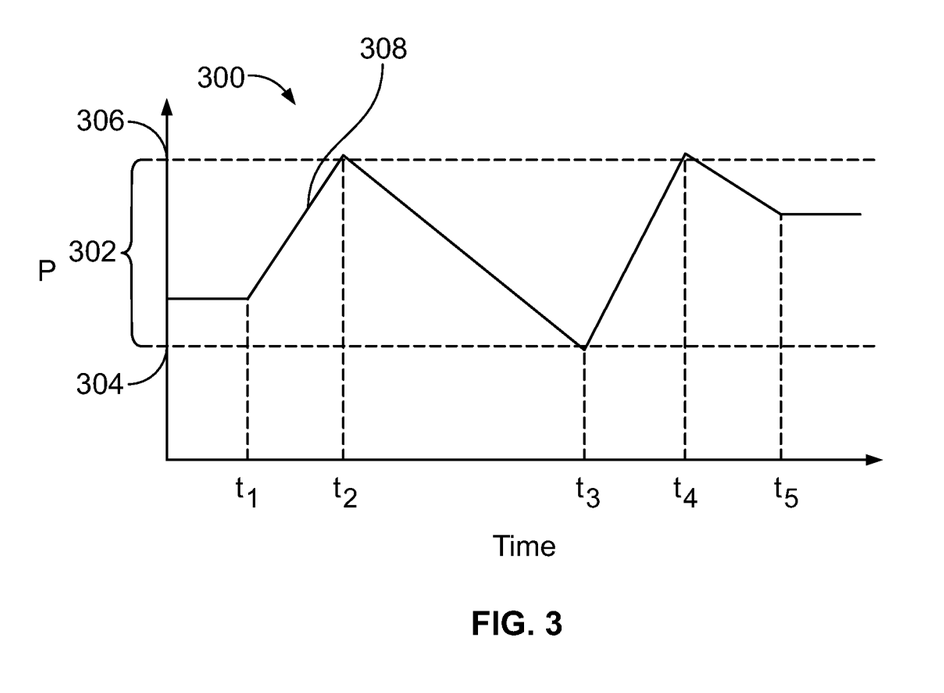
FIG. 3 is a graph showing pressure in the air reservoir of the vehicle over time according to an embodiment.

FIG. 3 is a graph 300 showing pressure in the air reservoir of the vehicle over time according to an embodiment. The control circuit controls the valves to maintain an air pressure of the air reservoir within a designated range 302. The designated range may represent air pressures that are necessary to ensure certain functions, such as successful air braking of the vehicle. If the air pressure drops below the lower limit 304 of the range, the air reservoir may not have sufficient air pressure to perform the certain functions. If the air pressure exceeds the upper limit 306 of the range, the high pressure may risk damage to the reservoir, the valves, and/or other components coupled to and/or proximate to the reservoir.

Time $t_1$ in the graph represents the time that the vehicle enters the motor braking mode of operation. The pressure within the reservoir prior to time $t_1$, as shown by the plot line 308, is constant at an amount within the designated range. At time $t_1$, the control circuit opens the flow valve 208 (shown in FIG. 2) or maintains the flow valve in the open position. The control circuit also controls the compressor to operate at the full power setting (or other designated setting at which the consumption capacity of the compressor is known). The compressor is maintained at the full power setting throughout the duration of the motor braking operation, which in the illustrated graph extends to time $t_5$.

As the compressor operates during the motor braking operation, the air that is compressed by the compressor flows through the tube to the reservoir, which gradually increases the air pressure of the reservoir from time $t_1$ to time $t_2$. At time $t_2$, the pressure of the air reservoir exceeds the upper limit of the designated range. The pressure in the reservoir may be monitored by the control circuit based on sensor signals received from a pressure sensor within the reservoir. In response to determining that the pressure is greater than the designated range, the control circuit generates a control signal to open the release valve 210 (shown in FIG. 2). The opening of the release valve releases part of the compressed air from the air reservoir while the compressor continues to be powered by the electric power on the DC bus. For example, from time $t_2$ to time $t_3$, both the compressor flow valve and the release valve are in the open state. The compressor provides compressed air to the reservoir and the release valve concurrently releases compressed air from the reservoir. In an embodiment, the amount or rate of compressed air exiting the reservoir via the release valve exceeds the amount or rate of compressed air fed to the reservoir by the compressor operating at full power, such that the air pressure in the reservoir gradually decreases to keep an air pressure of the air reservoir within the designated range. The rate at which the air pressure drops from time $t_2$ to time $t_3$ may be different than the rate of pressure increase from time $t_1$ to time $t_2$. In the illustrated embodiment, the pressure drop when the release valve is open is slower (e.g., more gradual) than the pressure increase that occurs when the release valve is closed. At time $t_3$, the pressure in the reservoir falls below the lower limit of the designated range, so the control circuit closes the release valve. The pressure in the reservoir increases again until the control circuit opens the release valve again at time $t_4$.

The control circuit may keep cycling the release valve between open and closed as shown in the graph to maintain the air pressure within the designated range while the compressor continuously operates at the full power setting. In the graph, the motor braking mode ends at time $t_5$, at which time the control circuit may close the compressor flow valve and/or turn off or modify the compressor operation. After time $t_5$, the air pressure in the reservoir is constant.

The one or more electrical devices that are controlled to consume the electric power generated by the traction motors during motor braking are not limited to the compressor shown in FIG. 2. Another example electrical device is a lighting system including one or more vehicle lights. The vehicle lights can include headlights, taillights, interior lights, and/or the like. Upon switching to the motor braking mode, the control circuit may turn on the lights of the lighting system. The lights may consume a relatively constant amount of electric power from the DC bus. Another example of electrical devices that can be used to consume the generated electric power by performing work include fans and blowers.

Another example electrical device is a HVAC system on the vehicle, such as a cooling apparatus and/or a heating apparatus. The cooling apparatus can include an air conditioner. The heating apparatus can include a heater or furnace. In an embodiment, upon switching to the motor braking mode, the control circuit may turn on the HVAC system. Like the valves shown in FIG. 2, the control circuit may control air handling equipment, such as louvers, to maintain the temperature within the vehicle, of the engine bay, and/or the like within a designated temperature range regardless of the continuous operation of the HVAC system during the motor braking mode. For example, the control circuit may operate the air conditioner at full power. Once the temperature within the vehicle falls below a lower limit of the designated temperature range, then the control circuit may adjust louvers to close the registers that emit the cooled air into the vehicle cabin, instead directing the cooled air into the engine bay or into the surrounding environment. The control circuit may adjust the louvers again to open the registers once the temperature in the vehicle cabin exceeds an upper limit of the designated temperature range.

Yet another example electrical device is a traction motor of the vehicle. As described above with reference to FIG. 1, during the motor braking mode the control circuit may control a first subset of the traction motors on the vehicle to function as generators and a second subset of the traction motors on the vehicle to consume electric power on the DC bus by generating propulsion as the work that is performed. This scenario in which some traction motors brake the vehicle while other traction motors exert torque to propel the vehicle may be applicable to a few specific situations, such as rollback of the vehicle down a grade. As the vehicle rolls down grade in a direction opposite the scheduled direction of travel, the first subset of traction motors perform motor braking to convert the kinetic movement of the vehicle to electric power, which slows the rollback due to the mechanical resistance in the motors and linkages. The second subset of traction motors can consume the electric power on the DC bus, either alone or in combination with one or more auxiliary electrical devices, to maintain the DC bus at a designated voltage range. The traction motors in the second subset consume the current to generate torque that is applied to the wheels and/or axles via the linkages to propel the vehicle in the scheduled direction of travel (e.g., opposite the rollback direction).

The control circuit optionally may concurrently operate multiple different types of electrical devices to consume the electric power generated by the one or more traction motors. For example, the control circuit may operate the compressor shown in FIG. 2 and an HVAC system in tandem throughout the motor braking operation.

Utilizing multiple electrical devices can result in an increased consumption capacity, which may alleviate stress on the inverters and motors by enabling the inverters and motors to supply more current to the DC bus.

Figure 4:
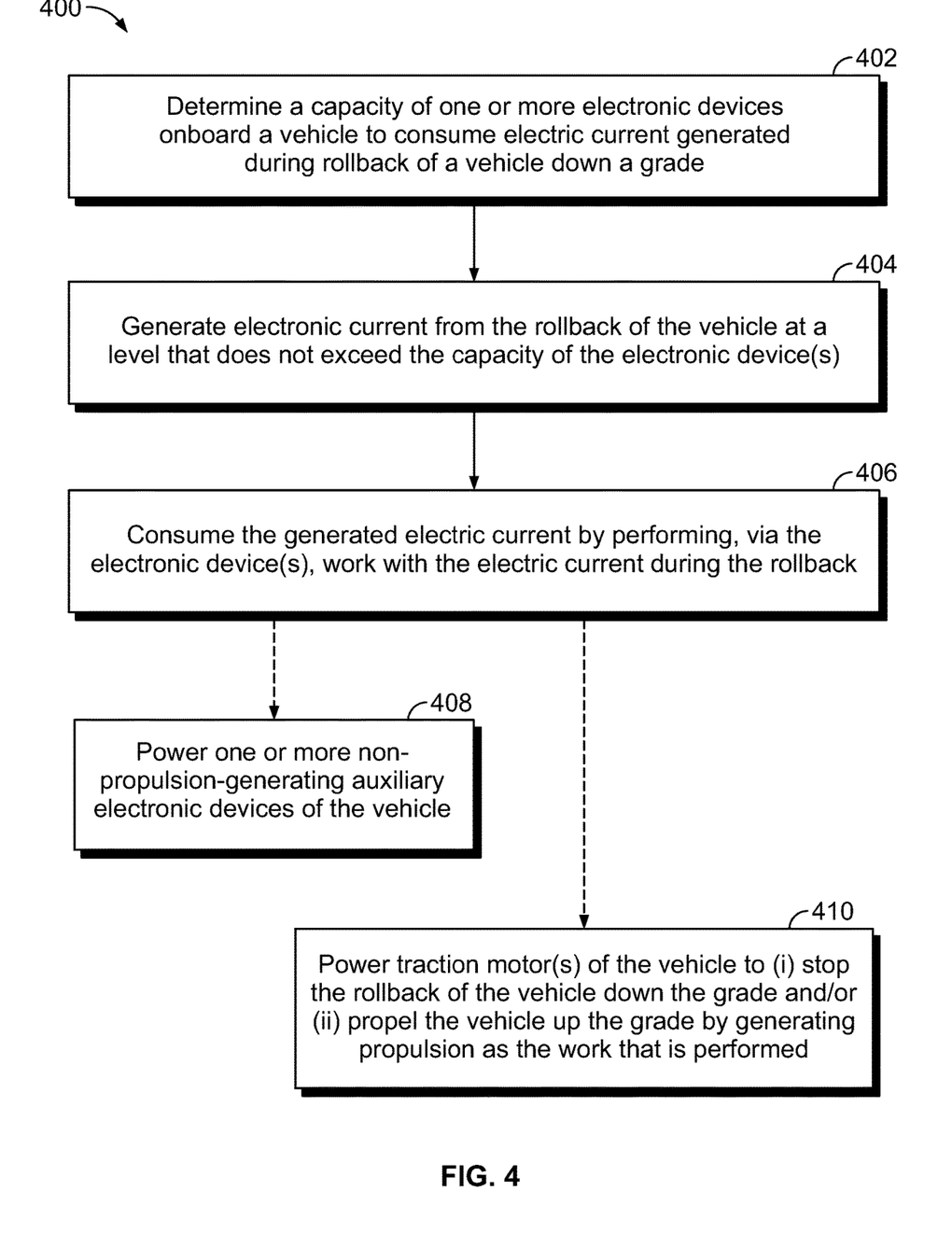
FIG. 4 is a flow chart of a method for performing motor braking of a vehicle according to an embodiment.

FIG. 4 is a flow chart 400 of a method for performing motor braking of a vehicle according to an embodiment. The method may be performed by the motor braking system described above with reference to FIGS. 1-3. Certain steps of the method may be performed by the control circuit shown in FIG. 1 based on programmed logic or instructions. The method optionally includes additional steps than shown, fewer steps than shown, and/or different steps than shown. By performing the method, electric power generated by one or more vehicle traction motors based on movement of the vehicle can be consumed during the movement of the vehicle (concurrently with the generation) without dissipating the current as heat through an array or grid of resistors.

At 402, a capacity of one or more electrical devices onboard a vehicle to consume electric power during rollback of a vehicle down a grade is determined. The capacity represents the amount or rate of electrical energy that the electrical devices can consume by performing work during the rollback of the vehicle. At 404, electric power is generated from the rollback of the vehicle down the grade. The electric power can be generated by one or more traction motors of the vehicle operated as electric generators to convert the kinetic energy of the vehicle during the rollback to electrical energy. The electric power that is generated is limited to a level that does not exceed the capacity of the electrical devices to consume the electric power during the rollback by performing work (e.g., not merely dissipating the current as heat by using resistors).

At 406, the electric power that is generated is consumed during the rollback of the vehicle by performing work with the electric power via the one or more electrical devices. Optionally, at 408, consuming the electric power during the rollback may involve powering one or more non-propulsion-generating auxiliary electrical devices of the vehicle, such as compressors, blowers, fans, HVAC systems, lighting systems, electronic systems, or the like. Optionally, at 410, consuming the electric power during the rollback may involve powering one or more traction motors of the vehicle to (i) stop the rollback of the vehicle down the grade and/or (ii) propel the vehicle up the grade by generating propulsion as the work that is performed.

Figure 5:
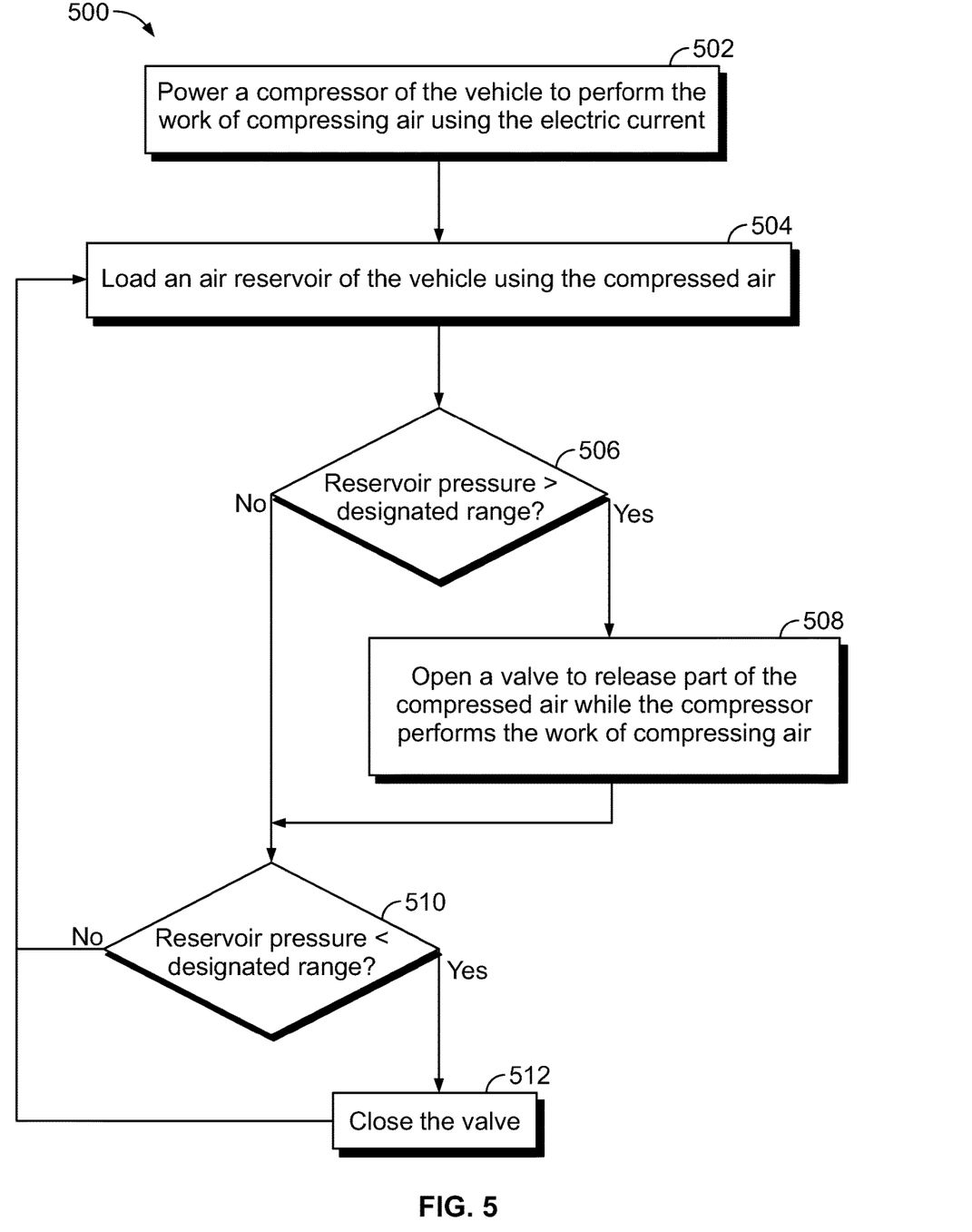
FIG. 5 is a flow chart of a method for consuming electric power according to an embodiment, which can be implemented within the motor braking method of FIG. 4.

FIG. 5 is a flow chart 500 of a method for consuming electric power according to an embodiment, which can be implemented within the motor braking method of FIG. 4. For example, the flow chart 500 may represent the electric power consuming step 408 of the method 400. In an embodiment, a vehicle has one or more non-propulsion-generating auxiliary electrical devices, including a compressor that is coupled to an air reservoir. At 502, the compressor is powered by the electric power generated during the rollback to perform the work of compressing air. At 504, an air reservoir of the vehicle is loaded using the compressed air from the compressor. At 506, it is determined whether the air pressure of the air reservoir is greater than a designated pressure range that represents an acceptable pressure. If the pressure exceeds the pressure range, then flow proceeds to 508 and a valve (e.g., a release valve) is automatically controlled to open to release part of the compressed air from the reservoir while the compressor continues performing the work of compressing air. Optionally, the compressed air from the compressor continues to be supplied to the reservoir while the valve is open to release compressed air from the reservoir.

After opening the valve or determining that the pressure of the reservoir is not above the designated range, then flow proceeds to 510 and it is determined whether the air pressure of the air reservoir is less than the designated pressure range. If so, then the valve is automatically closed in order to gradually increase the pressure within the reservoir based on the continued supply of compressed air from the compressor. After closing the valve or determining that the pressure is not below the designated range, flow may return to 504. It is noted that the loading of the air reservoir at 504 may continuously occur throughout the feedback control operations described in steps 506, 508, 510, and 512.

One or more technical effects of the vehicle motor braking system described herein include the ability to perform motor-based braking of a vehicle without requiring the use of, or even the presence of, a dynamic braking grid of resistors to dissipate excess motor-generated electric power in the form of heat. One or more technical effects may also include the ability to perform motor-based braking of a vehicle without requiring the use of, or even the presence of, an energy storage device for storing the motor-generated electric power for future use. By not relying on dynamic braking grids and/or energy storage devices, the motor braking system reduces the components necessary to provide motor braking, which enables motor braking to be performed on a wider array of vehicles.

In an embodiment, a system (e.g., a vehicle braking system) includes one or more traction motors and an electrical device configured to be electrically coupled with the one or more traction motors. The one or more traction motors are configured to propel a vehicle and to generate electric power during rollback of the vehicle down a grade. The electrical device is configured to consume the electric power generated from the rollback of the vehicle by performing work with the electric power during the rollback of the vehicle.

Optionally, the vehicle does not include a dynamic braking grid in which to dissipate the electric power as heat. Optionally, the electrical device is a non-propulsion-generating auxiliary electrical device. The non-propulsion-generating auxiliary electrical device may be configured to consume electric power at a rate no greater than an upper power limit, and the one or more traction motors are controlled to limit the electric power that is generated during the rollback to not exceed the upper power limit.

Optionally, the electrical device includes a compressor that is configured to be powered by the electric power to perform the work of compressing air. The compressor may be configured to be powered by the electric power to compress the air to load an air reservoir of the vehicle. The system may also include a valve fluidly coupled with the air reservoir of the vehicle. The valve is configured to release part of the air that is compressed in the air reservoir by the compressor while the compressor is powered by the electric power to keep an air pressure of the air reservoir within a designated range.

Optionally, the electrical device includes one or more traction motors that are powered by the electric power to one or more of (i) stop the rollback of the vehicle down the grade or (ii) propel the vehicle up the grade by generating propulsion as the work that is performed.

In an embodiment, a method (e.g., for vehicle braking) includes generating electric power from rollback of a vehicle down a grade. The method also includes consuming the electric power generated from the rollback of the vehicle by performing work with the electric power during the rollback of the vehicle.

Optionally, the electric power is consumed by powering one or more non-propulsion-generating auxiliary electrical devices of the vehicle. Approximately all of the electric power that is generated from the rollback of the vehicle may be consumed by powering the one or more non-propulsion-generating auxiliary electrical devices. The one or more non-propulsion-generating auxiliary electrical devices of the vehicle may be configured to consume electric power at a rate no greater than an upper power limit. Generating the electric power may include limiting the electric power that is generated during the rollback to not exceed the upper power limit.

Optionally, the electric power is consumed by powering a compressor of the vehicle to perform the work of compressing air using the electric power. The method may also include loading an air reservoir of the vehicle using the air that is compressed by the compressor that is powered by the electric power. The method may also include opening a valve to release part of the air that is compressed in the air reservoir by the compressor while the compressor is powered by the electric power to keep an air pressure of the air reservoir within a designated range.

Optionally, the electric power is consumed by powering one or more traction motors of the vehicle to one or more of (i) stop the rollback of the vehicle down the grade or (ii) propel the vehicle up the grade by generating propulsion as the work that is performed. Optionally, the electric power may be generated in one or more of an amount or at a rate that exceeds a capacity of an energy storage device of the vehicle such that less than all of the electric power can be stored in the energy storage device. Optionally, the vehicle does not include a dynamic braking grid in which to dissipate the electric power as heat.

In an embodiment, an electric vehicle is provided that includes a traction motor and a load. The traction motor is configured to generate electric power via regenerative braking during movement of the electric vehicle down a grade. The load is incapable of storing the electric power that is generated. The load is configured to receive the electric power and to perform work using the electric power that is generated from the regenerative braking during the movement of the electric vehicle down the grade.

Optionally, the load includes a compressor configured to compress air as the work that is performed using the electric power. Optionally, the traction motor is a first traction motor and the load includes a second traction motor configured to generate torque to urge the electric vehicle up the grade using the electric power.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
one or more traction motors configured to propel a vehicle, the one or more traction motors configured to generate electric power during rollback of the vehicle down a grade; and
a compressor configured to be electrically coupled with the one or more traction motors and fluidly coupled to an air reservoir of the vehicle, the compressor configured to consume the electric power generated by the one or more traction motors during the rollback of the vehicle by generating compressed air that is supplied to the air reservoir.

2. The system of claim 1, wherein the vehicle does not include a dynamic braking grid in which to dissipate the electric power as heat.

3. The system of claim 1, further comprising one or more processors communicatively connected to the one or more traction motors and configured to limit the electric power that is generated by the one or more traction motors during the rollback to not exceed an upper power limit that is associated with an electrical energy consumption capability of the compressor.

4. The system of claim 1, further comprising:
a valve fluidly coupled with the air reservoir of the vehicle, the valve configured to release some of the compressed air from the air reservoir while the compressor is powered by the electric power to maintain an air pressure of the air reservoir within a designated range.

5. The system of claim 1, wherein the one or more traction motors that generate the electric power during the rollback represent a first set, and the system further comprises a second set of one or more traction motors, the second set powered by the electric power generated by the first set to provide torque to one or more of (i) stop the rollback of the vehicle down the grade or (ii) propel the vehicle up the grade.

6. The system of claim 1, wherein the compressor is configured to continuously operate to generate the compressed air throughout a duration that the one or more traction motors generate the electric power in response to detection of the rollback.

7. The system of claim 6, wherein the compressor is configured to operate at a full power setting throughout the duration that the one or more traction motors generate the electric power in response to detection of the rollback.

8. The system of claim 1, wherein the air reservoir is a component of a brake system of the vehicle.

9. The system of claim 4, further comprising one or more processors communicatively connected to the valve, the one or more processors configured to open the valve when the air pressure within the air reservoir exceeds an upper limit of the designated range and close the valve when the air pressure within the air reservoir falls below a lower limit of the designated range.

10. A method comprising:
generating electric power from one or more traction motors of a vehicle during rollback of the vehicle down a grade, the one or more traction motors configured to propel the vehicle;
controlling a compressor to consume the electric power generated from the rollback of the vehicle by generating compressed air; and
supplying the compressed air, that is generated during the rollback of the vehicle, to an air reservoir to load the air reservoir.

11. The method of claim 10, wherein controlling the compressor comprises controlling the compressor to consume approximately all of the electric power that is generated by the one or more traction motors during the rollback of the vehicle.

12. The method of claim 10, wherein generating the electric power comprises limiting the electric power that is generated by the one or more traction motors during the rollback to not exceed an upper power limit that is associated with an electrical energy consumption capability of the compressor.

13. The method of claim 10, further comprising:
opening a valve to release some of the compressed air from the air reservoir while controlling the compressor to generate the compressed air and supplying the compressed air to the air reservoir to maintain an air pressure of the air reservoir within a designated range.

14. The method of claim 10, wherein the one or more traction motors that generate the electric power during the rollback represent a first set, and the method further comprises:
powering a second set of one or more traction motors of the vehicle with the electric power generated by the first set during the rollback; and
controlling the second set to provide torque to one or more of (i) stop the rollback of the vehicle down the grade or (ii) propel the vehicle up the grade.

15. The method of claim 10, wherein generating the electric power from the one or more traction motors during the rollback comprises generating the electric power in one or more of an amount or a rate that exceeds a capacity of an energy storage device of the vehicle such that less than all of the electric power can be stored in the energy storage device.

16. The method of claim 10, wherein controlling the compressor to consume the electric power by generating the compressed air comprises controlling the compressor to continuously operate to generate the compressed air throughout a duration that the one or more traction motors generate the electric power during the rollback.

17. A system comprising:
traction motors configured to be disposed onboard a vehicle and to propel the vehicle; and
one or more processors configured to control a first set of the traction motors to generate electric power via regenerative braking during rollback of the vehicle down a grade
the one or more processors configured to control a second set of the traction motors to use at least some of the electric power generated by the first set during the rollback to provide torque to one or more of (i) stop the rollback of the vehicle down the grade or (ii) propel the vehicle up the grade.

18. The system of claim 17, further comprising a compressor fluidly coupled to an air reservoir of the vehicle, the one or more processors configured to power the compressor using some of the electric power generated by the first set of the traction motors during the rollback to generate compressed air that is supplied to the air reservoir.

19. The system of claim 18, wherein the one or more processors are configured to control the compressor to continuously operate to generate the compressed air throughout a duration that the first set of traction motors generate the electric power during the rollback.

20. The system of claim 19, wherein the air reservoir includes a release valve configured to release some of the compressed air from the air reservoir, based on an air pressure within the air reservoir, while the compressor continues to generate the compressed air that is supplied to the air reservoir during the rollback.

* * * * *